June 30, 1970   H. K. BAINTER ET AL   3,517,427
METHOD OF MAKING A MULTISIDED STRUCTURE
Original Filed March 21, 1966   2 Sheets-Sheet 1

INVENTOR.
HUSTON K. BAINTER
BY MARVIN E. NEREM
Burd, Braddock & Bartz
ATTORNEYS

June 30, 1970  H. K. BAINTER ET AL  3,517,427
METHOD OF MAKING A MULTISIDED STRUCTURE
Original Filed March 21, 1966  2 Sheets-Sheet 2

INVENTOR.
HUSTON K. BAINTER
BY  MARVIN E. NEREM
Burd, Braddock & Bartz
ATTORNEYS United States Patent Office 3,517,427
Patented June 30, 1970

3,517,427
METHOD OF MAKING A MULTISIDED STRUCTURE
Huston K. Bainter and Marvin E. Nerem, Forest City, Iowa, assignors to Winnebago Industries, Inc., Forest City, Iowa, a corporation of Iowa
Continuation of application Ser. No. 536,058, Mar. 21, 1966. This application Sept. 9, 1968, Ser. No. 758,244
Int. Cl. B23p *17/00;* E04c *2/00*
U.S. Cl. 29—155
11 Claims

ABSTRACT OF THE DISCLOSURE

A sandwich panel multisided structure mountable on a vehicle body, as a pickup truck or trailer. The structure is a pickup cover formed from a single flat sandwich panel comprising a bendable sheet metal facing and a rigid plywood facing bonded to opposite sides of a flat core of plastic foam, as polystyrene foam. The panel is provided with spaced pairs of transverse grooves extended through the rigid plywood facing toward the bendable metal facing. The bases of the grooves are spaced from the metal facing. The grooves divide the panel into a roof section and opposite side sections. The side sections having openings for receiving window structures. The pickup cover is formed by bending the panel along the base of the V-grooves forming a roof converging outwardly to a longitudinal ridge and upright side walls. The back of the pickup cover is closed with an end wall having a door.

CROSS REFERENCE TO RELATED APPLICATION

This application is a continuation of U.S. application Ser. No. 536,058, filed Mar. 21, 1966, now abandoned.

SUMMARY OF INVENTION

The invention relates to a multisided structure and method of making the structure. The structure has side walls and a center or roof section formed from a single sandwich panel having a pliable outer facing and an inner rigid facing bonded to opposite sides of an expanded plastic foam core. Longitudinal corner sections with closed V-grooves separate the side walls from the center section. The bottom of the V-grooves are spaced from the pliable facing to fill out and reinforce the corners. The center section has an upwardly directed longitudinal ridge whereby the center section converges upwardly from the corner sections.

The method of making the structure from the one piece sandwich panel includes cutting V-grooves in the nonpliable facing and into the core to divide the panel into a center section and side sections. The panel sections are connected together with the core and pliable facing and are shipped as a single flat piece. The multisided hollow structure is erected by bending the core and pliable facing along the bases of the V-grooves to form corners. The expanded foam plastic core in the corners is compressed to fill out and reinforce the corners. In addition, the center section is bent outwardly to form a longitudinal ridge portion extended generally parallel to the V-grooves.

Figure 1:
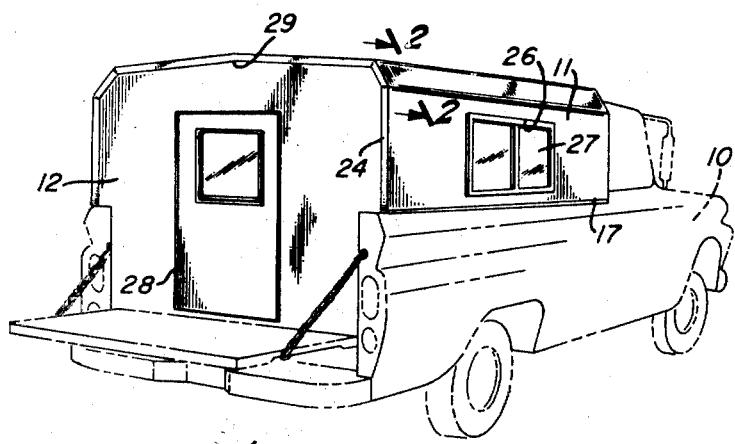
FIG. 1 is a perspective view of a pickup truck shown in light lines with a multisided hollow structure of the type possible by the means of this invention mounted thereon.

Referring now to the drawings, a practical use to which this invention may be put is in making what are known as covers and campers for trucks of the pickup type such a shown at 10 in FIG. 1. Both sides, such as the one 11, and the roof of the cover or camper are constructed from a blank formed according to this invention. The end member 12 and a second end member fitting in the opposite end of the cover adjacent the cab of truck 10 complete the structure.

Figure 3:
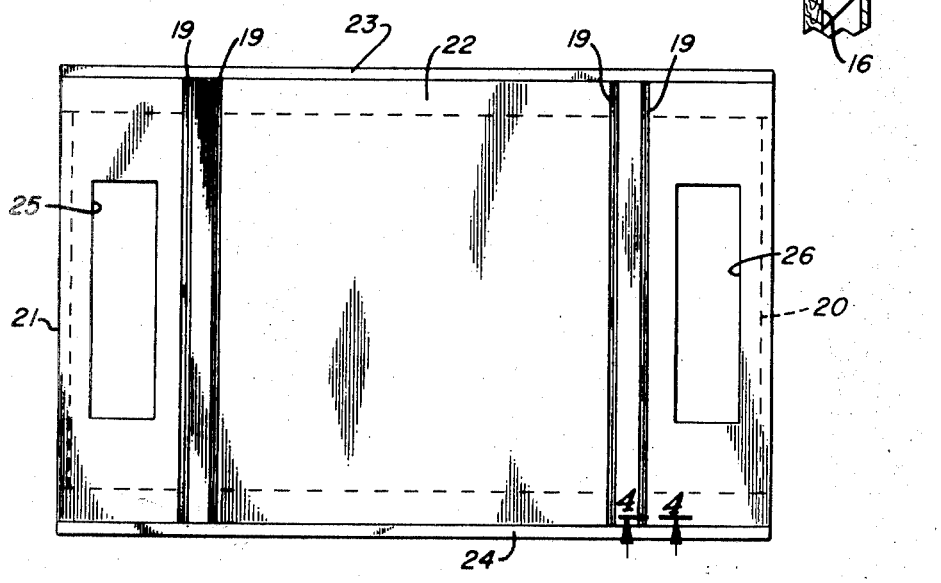
FIG. 3 is a plan view of a sandwich panel cut and grooved but not formed; and is drawn to the same scale as FIG. 1.

The portion of the cover including side 11, as shown in FIG. 3, is made flat in a single piece. Ends 12 and its counterpart also being flat, the entire device can be shipped in a knockdown condition in a space no larger than two of the elements shown in FIG. 3 before it is bent into shape. At an ultimate destination there is very little problem in bending the element shown in FIG. 3 and assembling it to the two ends such as the one 12 which makes the unit ready to be installed on a truck.

Figure 4:
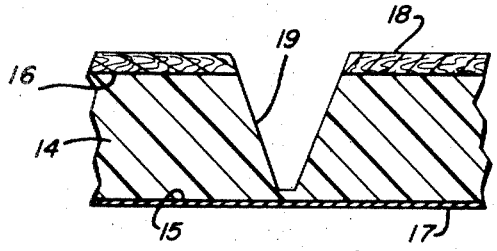
FIG. 4 is an enlarged fragmentary sectional view taken on the line 4—4 of FIG. 3 and is drawn to an even larger scale than FIG. 2.

As is best seen in FIG. 4, the sandwich panel from which the elements of this invention are made comprise a core member as shown at 14 secured to facing members 17 and 18. Bonding material 15 and 16 may be similar or dissimilar to each other depending on a number of factors such as the materials to be bonded and perhaps the use to which the panel will be put. At least one of the facing members, shown in FIG. 4 as facing member 17, must be pliable. That is to say it must be material that is capable of being bent without fracturing. A specific example of an acceptable combination for a particular function is illustrated in FIGS. 1 to 4 as being a sandwich panel having a foamed polystyrene core 14 with a first facing 18 of plywood and a second facing 17 of metal as aluminum.

The panel shown in FIG. 3 is as wide as the structure shown on truck 10 in FIG. 1 is long. This panel is grooved as shown at 19 in FIG. 4, the grooves extending transversely across the panel as shown at 19 in FIG. 3. The broken lines represent the inserts of wood that may be inserted at the edges of the panel. As for example, at 20 there may be a railing of wood which would have a corresponding member 21 on the opposite side of the panel shown in FIG. 3 to assist in securing the cover to the truck body. At each longitudinal edge are portions where the polystyrene core 14 has been cut back in order to leave a marginal edge 23 and 24 of uncovered sandwich panel facing 17.

The openings shown at 25 and 26 may be used to install windows such as the ones shown at 27 in the member 11 in FIG. 1.

Figure 2:
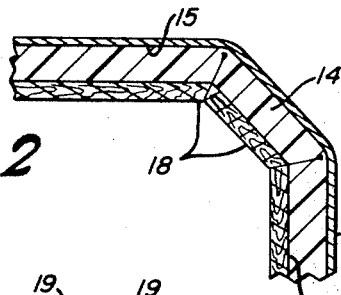
FIG. 2 is an enlarged section taken on the line 2—2 of FIG. 1.

The grooves 19 divide the entire panel into a series of sections, including a center section 22, which are coupled together at least by the pliable facing 17. As shown in FIGS. 4 and 2, a portion of the polystyrene or other core materials of the sandwich panel may also continue to link the sections after grooving.

Panel 12 may be provided with an opening closed with a door such as the one shown at 28. The panel 12 also may be of a different elevation having one or more top portions with the top center as shown at 29 being slightly higher than any other portions of the panel. The end member adjacent to the cab of the truck 10 may be similarly formed in order to bend the top center of portion 11 or center section 22 into a sort of ridge pole effect. In other words, the center section 22 converges outwardly to the longitudinal ridge 29 which extends parallel to the closed V-grooves as shown in FIGS. 1 and 2. This bending of the roof may alter both the appearance and the water shedding characteristics of the structure. It also tends to provide more rigidity to the otherwise completely flat roof portion of the portion 11.

The manner in which member 12 and member 11 are secured together is not of patentable importance and is not shown in detail since it may be done in any one of a number of ways. Illustrated here, for example, the flap edges 23 and 24 may be used to secure the panel 12 and its corresponding opposite panel adjacent the cab to the portion 11 as shown in FIG. 1.

Figure 5:
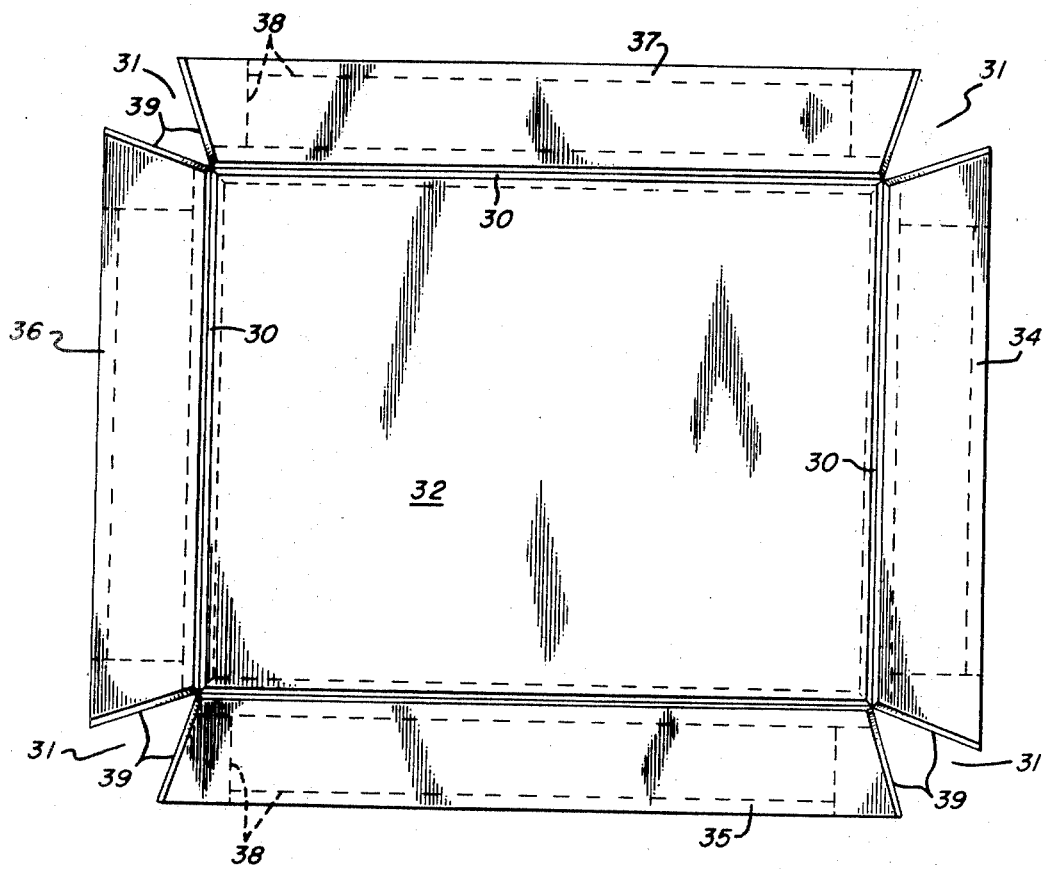
FIG. 5 is a different form of panel that has been both grooved and cut to produce a five-sided hollow device and drawn to substantially the same scale as FIG. 3.
Figure 6:
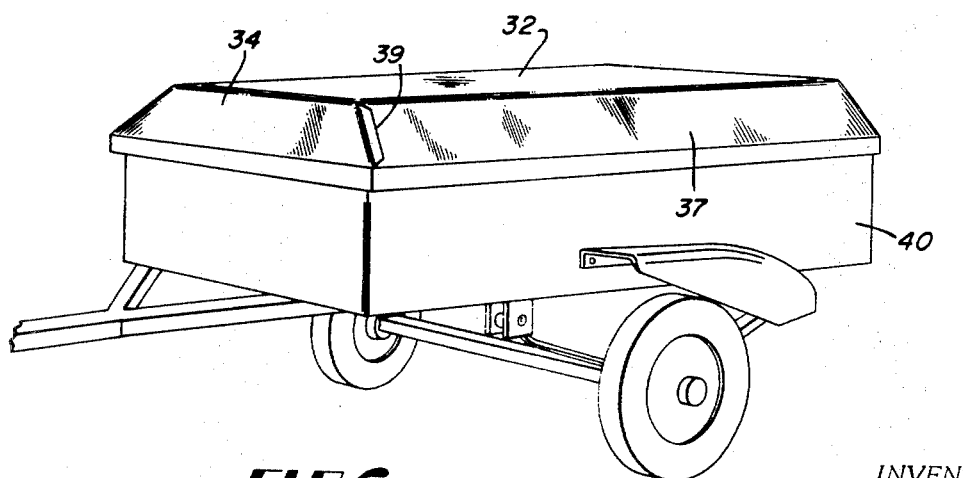
FIG. 6 is a perspective view of the blank in FIG. 5 formed into its ultimate shape.

In FIG. 5 it may be seen a panel in general similar to that shown in FIGS. 2, 3 and 4. The specific difference in this species resides in the fact that the panel has not only been grooved as shown at 30, but it has also been cut as seen at 31 whereby when force is applied to the various sections of the panel illustrated in FIG. 5 it may assume the configuration shown in FIG. 6. In this manner center 32 of the panel shown in FIG. 5 is surrounded by a series of wings designated 34 through 37 in a clockwise direction around the center panel 32 and beginning at the right thereof. The broken lines in the figure, at 38, for example, mark out areas where the foamed polystyrene or other core material of the paneling is replaced by a material that has greater tensile strength, as wood for example, for purposes of attaching hardware such as hinges and the like to the structure. When force is applied to the various wings 34, 35, 36 and 37 they may be bent with respect to the center panel 32 to form the multisided figure shown in FIG. 6. In this case, the panel is being used as a cover for the two wheeled trailer 40. As can be seen in FIG. 5 each of the openings or cuts 31 is bordered by uncovered edges or flanges of facing material. In each case the pliable facing of the sandwich panel has been bared to leave flanges for attaching tabs 39 of the uncovered pliable sandwich board facing. These tabs are used in forming the corners of the multisided structure shown in FIG. 6. A cover member 32–35 may be hinged at either side or either end to the trailer box 40. Alternatively it simply may be resting thereon with some kind of aligning members extending between the two to hold them in position. The cover is lifted off when it is desired not to cover box 40. Obviously the cuts 31 could be made substantially deeper and/or wider and change the configuration substantially. Also the grooves 30 need not necessarily extend in a straight line on all four sides and this could produce an effect somewhat similar to that illustrated in FIG. 1 in the form of the device shown there. In each case the critical fact is the combination of grooves in sandwich panels having at least one pliable face. These grooves extend from the face opposite the pliable face and leave unbroken, at least the pliable face. Bonding material is placed between all of the various facing members and core members in all of the figures, although not always illustrated.

The embodiments of the invention in which an exclusive property or privilege is claimed are defined as follows:

1. The method of making a multisided structure having a center section and side sections comprising: providing a sandwich type construction panel having a foamed plastic core, a first pliable facing member secured to one side of the core and a second non-pliable facing member secured to the opposite side of the core, forming a pair of V-grooves in said non-pliable facing member and said core, said grooves extending at least nearly to said pliable facing member to divide the panel into a center section and side sections, bending said panel along predetermined bending lines at the bases of said grooves after said V-grooves have been formed and longitudinally bending said center section outwardly whereby the center section converges outwardly to a ridge portion extended generally parallel to one of said V-grooves.

2. The method of claim 1 wherein a first pair of parallel V-grooves are formed to separate the center section from one side section and a second pair of parallel V-grooves are formed to separate the center section from the other side section.

3. The method of claim 1 including providing at least one opening in one of said sections to receive a building element different from said panel.

4. The method of claim 1 wherein the V-grooves extend substantially parallel to each other.

5. The method of claim 1 wherein each V-groove is formed with a flat base spaced from the first pliable facing member.

6. A method of making a multisided structure having a roof section and side sections comprising: providing a sandwich type construction panel having a foamed plastic core, a first pliable facing member secured to one side of the core and a second non-pliable facing member secured to the opposite side of the core, cutting a first spaced pair of V-grooves and a second spaced pair of V-grooves in said non-pliable facing member and core to divide the panel into a roof section and side sections, each of said grooves extending at least nearly to said pliable facing member, all of said grooves extending across the panel and into the core, bending said panel along the bases of said grooves to form the roof section and side sections of the structure and longitudinally bending said roof section outwardly whereby the roof section converges upwardly to a ridge portion extended generally parallel to one of said V-grooves.

7. The method of claim 6 including providing at least one opening in one of said sections to receive a building element different from said panel.

8. A method of making a pickup cover having a roof section and side sections comprising: providing a sandwich type construction panel having a foamed plastic core, first pliable facing member secured to one side of the core, a second non-pliable facing secured to the opposite side of the core, forming a pair of spaced V-grooves in said non-pliable facing member and said core, said grooves extended at least nearly to said pliable facing member to divide the panel into a center section and side sections, and bending said panel along predetermined bending lines along the bases of said grooves after said V-grooves have been formed to provide a multisided pickup cover.

9. The method of claim 8 wherein a first pair of parallel V-grooves are formed in the panel to separate the center section from one side section and a second pair of parallel V-grooves formed in the panel to separate the center section from the other side section.

10. The method of claim 8 including providing at least one opening in one of said sections to receive a building element different from said panel.

11. A method of making a multisided structure having a first section and a second section comprising: providing a sandwich construction panel having a core of expanded compressible plastic foam, a first pliable facing secured to one side of the core, and second non-pliable facing means secured to the opposite side of the core separating the second non-pliable facing means to form a first panel section and a second panel section, bending said core and pliable facing along bending lines located between the separated second non-pliable facing means thereby compressing said core in the region of said bending lines, and longitudinally bending a portion of one of said panel sections outwardly whereby said one panel section converges outwardly to a ridge portion extended generally parallel to said bending lines.

References Cited

UNITED STATES PATENTS

| 283,136 | 8/1883 | Mosler | 29—155 |
| 2,149,882 | 3/1939 | Clements | 29—476 |
| 2,277,615 | 3/1942 | Townsend | 29—155 |

THOMAS H. EAGER, Primary Examiner

U.S. Cl. X.R.

52—631